Nov. 24, 1970     D. R. WOLTHAUSEN     3,543,302
REMOTELY-OPERABLE ENGINE-STARTING SYSTEM
Filed Sept. 20, 1968
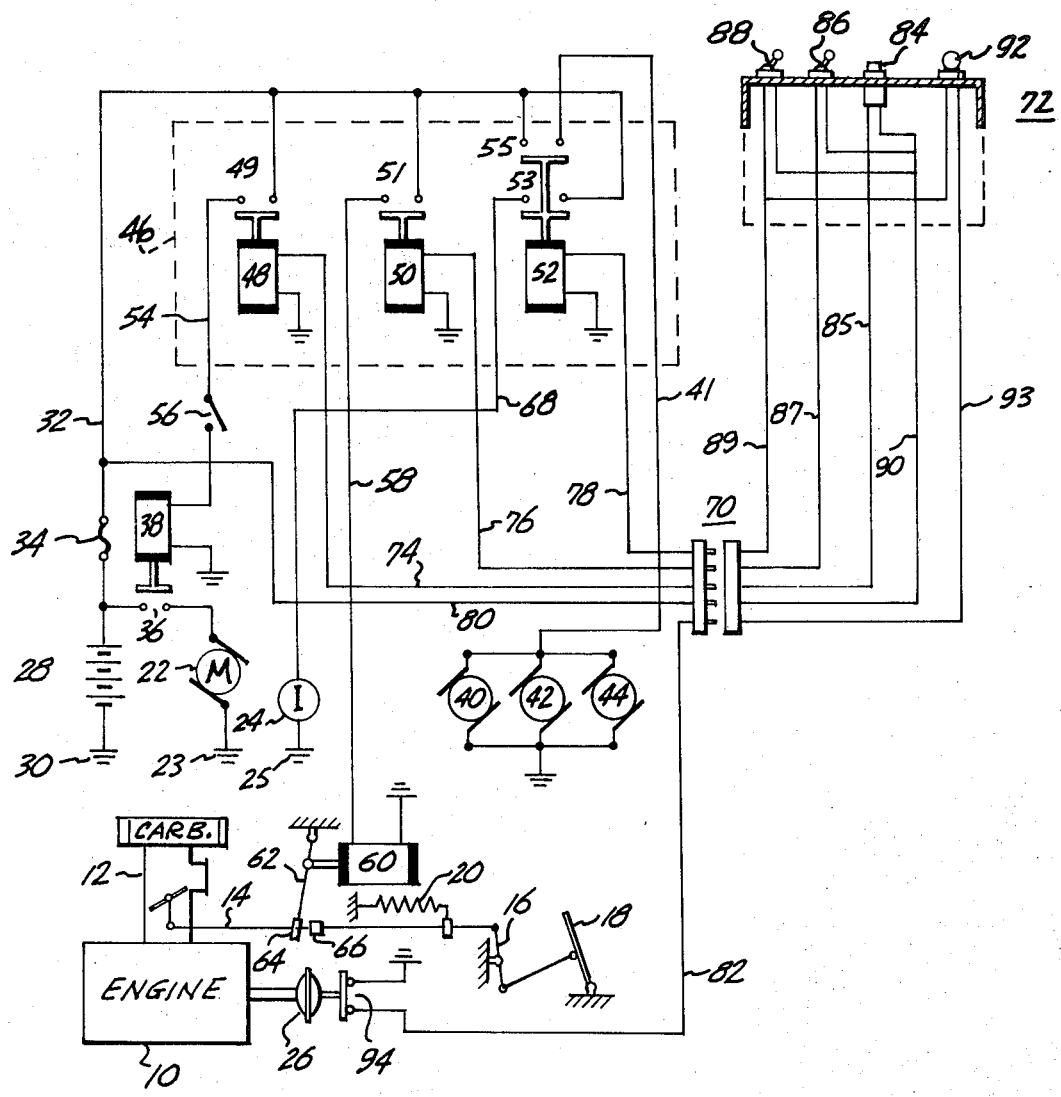
INVENTOR
DELBERT R. WOLTHAUSEN
BY Ford E. Smith
ATTORNEY

United States Patent Office 3,543,302
Patented Nov. 24, 1970

3,543,302
REMOTELY-OPERABLE ENGINE-STARTING SYSTEM
Delbert R. Wolthausen, Rte. 1, Tieton, Wash. 98947
Filed Sept. 20, 1968, Ser. No. 761,261
Int. Cl. F02n *11/12*
U.S. Cl. 123—179                              3 Claims

ABSTRACT OF THE DISCLOSURE

An improved engine-starting system adapted for remote control includes means for advancing the "idle" speed of the fuel system and indicator means at the remote control position to warn of failure of the engine to operate.

SUMMARY OF THE INVENTION

An engine, which may be the main power means of a mobile vehicle or of a stationary pump or generator or like system, is equipped with electromotive means to adjust the fuel metering equipment of the engine. A group of three switching relays is provided to close circuits to said electromotive means, the engine ignition circuit, and the usual starting motor circuit. At a remote station is a control panel having three switches connected with said three switching relays. A normally closed signal circuit, associated with one of said switches, is opened during engine operation under negative pressure then generated. Failure of engine operation permits closing of said signal circuit and excitation of a sensible signal element.

DRAWING

The drawing is a wiring diagram schematically showing the system related to an engine and its appurtenances.

DESCRIPTION OF INVENTION

In the drawing, engine 10 has carburetor 12 constituting an adjustable fuel metering means which is operated by the accelerator linkage including link 14, lever 16 and foot pedal 18. Spring 20 returns link 14 to its normal "idle" position. When starting motor 22, grounded at 23, is energized by the closing of the usual starter switch (not shown). The ignition coil system 24 grounded at 25 is simultaneously energized as the engine is started whereupon vacuum created is applied to a diaphragm in unit 26. Current is supplied to the system from battery 28 grounded on one side at 30 and connected to main 32 which includes a fuse 34.

Motor 22 is connected with current supply main 32 by the closure of switch 36 upon actuation of solenoid 38 which is energized both when the engine is started in the normal manner and when started by this remotely operable system.

The drawing also includes auxiliary motors 40, 42 and 44 which in the case of a vehicle engine may be respectively the windshield wiper motor, the heater fan motor and defroster fan motor or similar auxiliary equipment.

Preferably adjacent to the engine 10 is provided a panel 46 mounting an assembly of grounded solenoids 48, 50 and 52 actuating when energized switches 49, 51 and 53 respectively connected in parallel to drops from main 32. Solenoids 48, 50 and 52 and their related switches comprise first, second and third switching relays.

Lead wire 54 includes transmission safety switch 56 which is normally closed when the transmission is in neutral position. Lead 54 is connected with solenoid 38 associated with switch 36.

Lead wire 58 connects from switch 51 to accelerator solenoid 60 which actuates lever 62 to move yoke 64 into engagement with boss 66 on carburetor link 14 to move the same and adjust the carburetor to a level above the "idle" setting. This arrangement constitutes electro-motive means at the engine to adjust the fuel metering means.

Lead wire 68 connects from switch 53 to the ignition coil system 24. A second switch 55 also closed upon actuation of solenoid 52 controls a circuit including lead wire 41 extending to auxiliary motors 40, 42 and 44.

A two-part multi-circuit disconnectable coupler 70 is disposed between the engine circuitry just described and a remote switching control panel 72. Lead 74 from solenoid 48, lead 76 from solenoid 50, lead 78 from solenoid 52, auxiliary main lead 80 from main 32, and lead 82 from vacuum openable switch 84 all extend to one part of coupler 70.

On panel 72 are first, second and third switches 84, 86, 88 connected by leads 85, 87, 89, respectively, with leads 74, 76, 78 and solenoids 48, 50 and 52. Switches 84, 86 and 88 are in placed circuit with the common auxiliary main 80 by lead 90. A signal bulb 92 is in circuit between leads 89 and 93 and lead 82 when the coupled 70 is connected to energize normally closed switch 94. Switch 94 is opened due to operation of vacuum unit 26 when engine 10 in running.

OPERATION OF INVENTION

For purposes of illustration let it be assumed that this invention is to be used in connection with an internal combustion engine in a vehicle and that the remote control station is located in an adjacent dwelling or the like. The utility of such an installation is apparent when it is considered that the vehicle engine has to be inoperable for a substantial period of time during very cold weather.

Upon the vehicle operator discontinuing prior operation of the engine, he places the transmission in neutral closing switch 56 and opens the usual ignition switch by removing the ignition key. He then joins the parts of connector 70 which is preferably located at the vehicle. This couples lead 90 directly with battery 28. The cable comprising leads 85, 87, 89, 90 and 93 will then extend between the engine and the remote panel 72. Switches 84, 86 and 88 at this time are normally open and bulb 92 is not ignited. The system is then ready for remote starting of the engine.

When the operator desires to start the engine 10, he closes second switch 86 energizing second solenoid 50, closing switch 51 and energizing solenoid 60 to adjust the carburetor to a level above the usual "idle" level through the action of lever 62 and yoke 64 drawing the link in the same direction as if it were pedally moved by the operator.

The closure of third switch 88 activates third solenoid 52 thus closing switches 53 and 55 and energizing both the ignition system 24 and the auxiliary motors 40, 42 and 44. Also bulb 92 in this circuit will light.

Thereupon closing of first switch 84 will close first relay switch 49 energizing solenoid 38 and closing switch 36 putting starting motor 22 directly in circuit with the battery 28. This will cause the engine to turn over and fire to begin its operation. The operating engine creates vacuum that will activate element 26 to open switch 94 to break the circuit including indicator bulb 92 which goes dark. As long as the engine is running, bulb 92 remains dark. Should the engine fail to start or once started should it die, the lamp bulb 92 is immediately re-lit to warn the operator, who presumably, will have remote station under observation. Non-burning of bulb 92 indicates a functioning engine.

Normally it is desirable to start the engine at a high level of acceleration as described. After operation has proceeded for awhile, the operator may wish to reduce engine operation to the "idle" level or a lower r.p.m. To do so he merely opens second switch 86, second relay switch 51 de-energizing solenoid 60. Thereupon spring means 20 retracts link 14 and the engine r.p.m. drops accordingly to its normal setting.

What is claimed is:

1. In an engine-starting system wherein the engine is provided with adjustable fuel-metering means and actuator means for adjusting said fuel metering means, a starting motor, a source of electrical energy, an ignition circuit, and a starting motor circuit, the combination, comprising:

electromotive means at said engine operable on said actuator means to adjust said fuel metering means to a level above an "idle" setting;

first, second, and third switching relays at said engine, each operating contacts in circuits between said source and, respectively, said electromotive means, said ignition circuit, and said starting motor circuit;

a control station, remote from said engine, having first, second and third switch means conductively connected with said first, second and third switching relays, respectively;

a normally closed signal circuit associated with said second switch means and including signal means at said remote station; and vacuum-responsive switch means in said signal circuit associated with said engine and operable to open and maintain open said signal circuit while said engine is running.

2. A system according to claim 1 in which the engine in a prime-mover of a motor vehicle, and the combination includes: electrical powered air-conditioning apparatus in normal open circuit with said source, and said third switching relay operates contacts to close said circuit to energize said apparatus.

3. A system according to claim 1 in which the actuator means for said fuel metering means including a longitudinally movable link member, and said electromotive means is coupled to said link member to move the same longitudinally.

References Cited

UNITED STATES PATENTS

| 2,544,955 | 3/1951 | Harrelson | 290—37 |
| 2,791,699 | 5/1957 | Taylor | 290—38 |
| 2,934,055 | 4/1960 | Kennedy | 123—179 |
| 2,952,782 | 9/1960 | Woyden | 290—37 |
| 3,443,557 | 5/1969 | Hebert | 123—179 |
| 3,455,403 | 7/1969 | Hawthorne | 123—179 XR |

LAURENCE M. GOODRIDGE, Primary Examiner